H. LAURENCE
TOOTH-PICKS.

No. 194,447. Patented Aug. 21, 1877.

Witnesses:
J. West Wagner.
Floyd Norris.

Henry Laurence
by Johnson & W Johnson
Attys.

UNITED STATES PATENT OFFICE.

HENRY LAURENCE, OF NEW ORLEANS, LOUISIANA.

IMPROVEMENT IN TOOTH-PICKS.

Specification forming part of Letters Patent No. 194,447, dated August 21, 1877; application filed June 14, 1877.

*To all whom it may concern:*

Be it known that I, HENRY LAURENCE, of New Orleans, in the parish of Orleans and State of Louisiana, have invented certain new and useful Improvement in Tooth-Picks; and I do hereby declare that the following is a full, clear, and exact description thereof, which will enable others skilled in the art to which it appertains to make and use the same, reference being had to the accompanying drawings, and to the letters of reference marked thereon, which form a part of this specification.

The quill is undoubtedly the best material for removing particles of food from between the teeth; but the quill tooth-pick is not adapted to be carried in the vest-pocket, as its points are apt to prick the fingers while searching for it, to become curled and broken, and to pass through the pocket-lining.

To avoid these disadvantages, and to produce a tooth-pick of quill adapted for pocket-carrying, is the object of my invention.

In carrying out my object I inclose the quill in a tube or carrying-barrel, of any suitable material, after the manner of the sliding pencils in common use. A simple spring combines the quill and the tube together, a projecting loop of which spring moves in a slot in the tube to throw and withdraw the quill. The quill may be pointed at both ends; the feather end, being the thickest and strongest, is used for the larger spaces between the teeth, while the thin end is used for picking in the small interstices.

The spring is preferably semi-elliptical, with a loop or detent at its greatest bend or middle. It is held in the quill by this loop, and by this means, also, keeps the quill confined to the tube. A hole in the quill receives the loop of the spring, which is inserted by depressing the spring and pushing it inside the quill until the loop reaches the hole, into which it projects, and the quill, with its spring, is inserted in the tube in the same manner, so that when one quill becomes worn and useless it is an easy matter to replace it by a new one. The tube or barrel may be open at both ends, to permit either point of the quill to be projected.

Figure 1:
Figure 2:
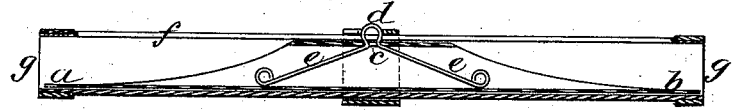
Figure 3:
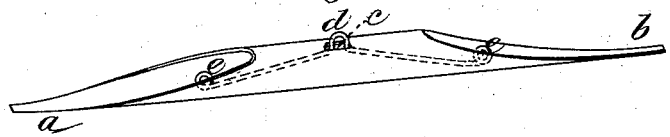
Figure 4:
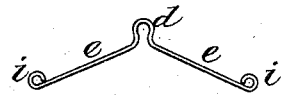
Figure 5:
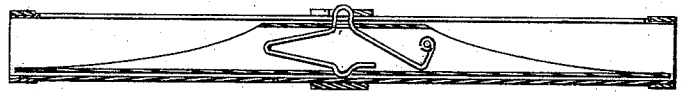

In the accompanying drawings, Figure 1 represents a view of the tooth-pick complete, one end of the quill being projected as in use; Fig. 2, an enlarged section of the same, the quill being inclosed; Fig. 3, a view of the quill with its spring attachment; Fig. 4, details of the spring; and Fig. 5, a modified form of spring.

I take the quill as it is sold in shops, or as it comes from the fowl, round it into a cylindrical, or nearly cylindrical, shape, point both ends $a$ $b$, leaving the stout feather end for use between the larger tooth-spaces. The points $a$ $b$ are made like the usual tooth-pick points of quills, but are preferably broad-nibbed, as shown, for the purpose of pushing the food from between the teeth. An uncut cylinder is left between the two points $a$ and $b$, in the middle of which, or anywhere on its periphery, a hole or slot, $c$, is cut for the purpose of receiving the loop $d$ of a spring, $e$, which is preferably of the semi-elliptical shape shown in Fig. 4. The spring is inserted by depressing it with the finger and pushing it into the quill-cylinder until it reaches the slot $c$, into which it projects, and thus the spring is combined with the quill; but any suitable detent may be provided to the quill for operation in the slot $f$ of the tube or barrel $g$, into which the quill, thus equipped, is inserted in the same manner, viz., by depressing the spring-loop $d$ until it passes the end rim or band of the barrel and into the long slot.

As before stated, the spring and quill are as readily removed as inserted, and a new quill may be supplied to the tube at any time without trouble, using the same spring; but such is the ease and cheapness of the whole manufacture that, in practice, I shall probably select the quills to fit, and provide each one with a spring. The two ends of the spring are bent, as shown at $i$, to form feet or runners, and to give a purchase for the finger in pushing the spring into the quill. The spring might be of the form shown in Fig. 5, should it be desirable, owing to the possible loose fit of the quill in the tube, one foot of the spring being bent backward, its end terminating with a curve, which curve is made to protrude through a longitudinal slot cut in the quill, so that said curve shall press against the inner surface of the tube, thus preventing any unnecessary slip of the quill in its case or tube.

The construction of my whole device is also adapted for quill pens.

I claim—

1. The combination, with a quill tooth-pick, of a spring loop or detent, $e\ d$, and a slotted carrying tube or barrel, $g\ f$, substantially as described.

2. The quill tooth-pick, pointed at one or both ends, having a slot or opening, $c$, in its periphery, and a spring-detent $e\ d$, inclosed, whereby said quill tooth-pick is adapted to be carried in a slotted tube, and to be projected and retracted.

3. A double-pointed quill provided with a detent, in combination with a slotted carrying tube or barrel open at both ends, for the purpose set forth.

In testimony that I claim the foregoing I have affixed my signature in the presence of two witnesses.

HENRY LAURENCE.

Witnesses:
 ANDREW HERO,
 C. H. STOCKER.